United States Patent [19]
Rathbun et al.

[11] Patent Number: 4,652,001
[45] Date of Patent: Mar. 24, 1987

[54] CHUCK KEY ASSEMBLY

[76] Inventors: Gordon Rathbun, 825 Logan; Mark L. Rathbun, 709 Logan, both of Moscow, Id. 83843

[21] Appl. No.: 837,962

[22] Filed: Mar. 10, 1986

[51] Int. Cl.⁴ .............................................. B23B 31/06
[52] U.S. Cl. ...................................... 279/1 K; 24/3 E; 24/3 M; 24/300; 224/200; 224/251; 81/16; 279/1 Q
[58] Field of Search .............................. 279/1 K, 1 Q; 408/241 R; 81/16; 24/300, 301, 3 E, 3 M; 70/457, 458; 224/200, 251, 254

[56] References Cited
U.S. PATENT DOCUMENTS

| | | | |
|---|---|---|---|
| 831,391 | 9/1906 | Vbellar | 24/326 X |
| 2,552,694 | 5/1951 | Stoner | 279/1 K |
| 4,093,396 | 6/1978 | Widigs | 279/1 K |
| 4,128,356 | 12/1978 | Carlisle | 70/457 X |

Primary Examiner—Gil Weidenfeld
Assistant Examiner—Steven C. Bishop
Attorney, Agent, or Firm—James D. Givnan, Jr.

[57] ABSTRACT

A length of elastic tubing carries a tool chuck key inserted at a free end of the tubing. The tubing is provided at its remaining end with a mounting arrangement for clamped engagement with the electrical cord serving a chuck equipped power drill. The elastic tubing permits the key and the mounting arrangement to be in frictional engagement with tubing end segments.

1 Claim, 4 Drawing Figures

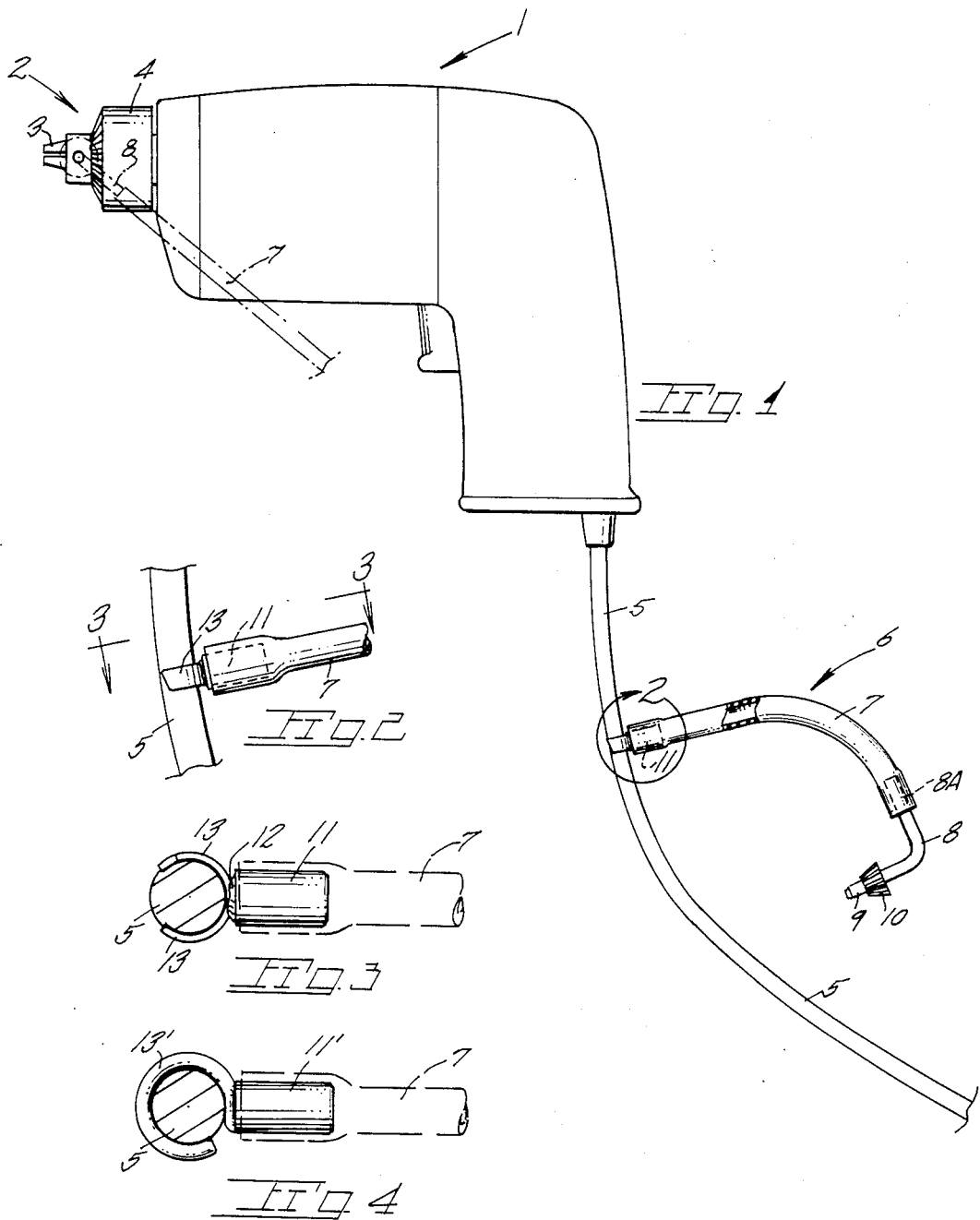

CHUCK KEY ASSEMBLY

BACKGROUND OF THE INVENTION

The present invention pertains generally to mounting arrangements for tool chuck keys.

Powered hand tools, such as electric drills for example, include multi-jaw chucks which are opened and closed by an inserted chuck key. Accordingly, each time a tool is to be inserted into the chuck, the chuck must be opened and subsequently closed about the inserted tool. Where the work at hand requires the use of different chuck mounted tools considerable time is lost in the opening and closing of the chuck. Previous attempts to provide a readily accessible chuck key are disclosed in U.S. Pat. Nos. 4,534,573; 4,334,809; 3,049,946; 2,941,426; and 2,257,559. All of the foregoing patented devices disclose key mounting arrangements which enable support of the chuck operating key on the electrical cord serving the power tool. Generally, such arrangements require radical displacement of the electrical cord toward the tool chuck to permit key insertion into the chuck or alternatively provide a socket into which the key is frictionally inserted which requires deliberate key insertion after each chuck adjustment. A further drawback to some known chuck key holders is that rotation of the key is resisted by the electrical cord to which the key is attached. Accordingly, several rotations of the key during a large adjustment of the chuck will cause twisting of the electrical cord.

SUMMARY OF THE PRESENT INVENTION

The present invention is embodied within a tool chuck key assembly for attachment to the cord serving the power tool while permitting a wide range of key positioning without displacement of the power tool or the cord serving same.

The present assembly includes a length of elastic material having a fitting at one end for securement to the power cord. The remaining end of the elastic member receives one end of the key and permits convenient key displacement toward the tool chuck in a highly convenient manner.

Attachment of the present assembly to the electrical cord of the tool is conveniently accomplished by the formation of a fitting which may be biased into engagement with the cord. Slight variances in cord diameter may be compensated for with a single fitting suitable for all common cord sizes.

Important provisions include the provision of a chuck key assembly permitting convenient key insertion into the chuck and key rotation without severe displacement of the power tool or the cord serving same; the provision of a chuck key assembly permitting rotation of the chuck key without resulting in twisting of the power cord on which the assembly is mounted; the provision of a chuck key assembly adapted for engagement with a wide range of power cord sizes; and the provision of a tool chuck key assembly of low cost manufacture and one that lends itself to clamped power cord attachment by the tool user.

BRIEF DESCRIPTION OF THE DRAWINGS

In the accompanying drawings:

FIG. 1 is a side elevational view of a typical power drill and tool chuck and with the present key assembly in place on the power supply cord for the drill;

FIG. 2 is an enlarged fragmentary view of that portion of FIG. 1 encircled at 2;

FIG. 3 is an enlarged horizontal sectional view taken downwardly along line 3—3 of FIG. 2;

FIG. 4 is a view similar to FIG. 3 but showing a modified form of an attachment fitting.

DETAILED DESCRIPTION OF THE PREFERRED EMBODIMENTS

With continuing attention to the drawings wherein applied reference numerals indicate parts similarly hereinafter identified, the reference numeral 1 indicates generally a portable, electic drill.

The electric drill is fitted in the typical manner with a tool chuck indicated generally at 2. Such tool chucks are well-known and include multiple jaws at 3 which are opened and closed about a tool upon rotary motion being imparted by a chuck key to a tool chuck member 4.

The electric drill is served by an electrical cord 5 fitted with an electrical plug at its unshown end.

The present tool chuck key assembly is indicated generally at 6 and includes an elongate elastic member 7 which is preferably formed from surgical tubing. Surgical tubing is highly elastic and capable of stretching to a length several times its relaxed or normal length.

A tool chuck key at 8 includes a handle end segment 8A in frictional engagement with one end of elastic member 7. The chuck key typically includes a spindle end at 9 and a bevel gear at 10, the latter for engagement with the tooth equipped, chuck member 4. One suitable key engagement with elongate member 7 is by insertion of the chuck key end into the tubular elastic member with the somewhat larger chuck key handle being in frictional engagement with the end segment of the elastic member.

Mounting means at 11 serves to couple the remaining end of elastic member 7 with power cord 5 by the user. The attachment point is preferably close enough to permit convenient use of the chuck key upon stretching of member 7 while avoiding interference with use of the power drill. The mounting means includes an insertable cylindrical member adapted for frictional engagement with an end segment of elongate member 7 as by insertion thereinto. A clamp at 13 of the mounting means is adapted for biased engagement with cord 5 in a non-slipping manner. A preferred mounting means includes a deformable clamp which may be closed into cord engagement. For this purpose clamp 13 may be of malleable material and attached to member 11 by soldering as at 12.

A modified mounting means is shown in FIG. 4 wherein parts similar to the above described parts of the first described mounting means are identified with prime reference numerals. A modified clamp 13' is of eye configuration and of a malleable nature to permit partial closing about cord 5. An insertable member 11', as in the earlier described form of mounting means, is adapted for frictional engagement with an end segment of the elastic member.

While I have shown but a few embodiments of the invention, it will be apparent to those skilled in the art that the invention may be embodied still otherwise without departing from the spirit and scope of the invention.

Having thus described the invention, what is claimed and desired to be secured in a Letters Patent is:

1. A tool chuck key assembly for attachment to an electrical cord serving a power tool, said assembly comprising, an elongate elastic member of tubular construction throughout its length, a chuck key including a handle, said handle having an end segment in inserted frictional engagement with one end of said elastic member, and mounting means including an insertable member in inserted engagement with the remaining end of said elastic member, said insertable member having a deformable circular portion offset from said remaining end of the elastic member and deformable into gripping engagement with the electrical cord.

* * * * *